United States Patent [19]

Miramon

[11] Patent Number: 5,546,997
[45] Date of Patent: Aug. 20, 1996

[54] EASILY-CLEANED REUSABLE LID INCLUDING AN EVACUATING PUMP

[75] Inventor: Eric J. Miramon, Morro Bay, Calif.

[73] Assignee: Invental Laboratory, Inc., Morro Bay, Calif.

[21] Appl. No.: 419,193

[22] Filed: Apr. 10, 1995

Related U.S. Application Data

[63] Continuation-in-part of Ser. No. 49,005, Apr. 19, 1993, Pat. No. 5,406,992.
[51] Int. Cl.$^6$ .................................................. B65D 51/24
[52] U.S. Cl. .............................. 141/65; 141/64; 215/228; 53/88; 220/203.04; 220/203.07; 417/545
[58] Field of Search .................................. 141/65, 63, 64, 141/65, 69; 215/228, 260, 307, 309, 312, 311; 53/88; 220/203.04, 203.07, 203.12, 203.13, 203.19, 203.21, 203.27, 203.29, 206, 303; 417/545, 234, 554

[56] References Cited

U.S. PATENT DOCUMENTS 3,943,987  3/1976  Rossi ................................. 220/203.04
4,016,999  4/1977  Denzer ................................. 220/231
5,244,113  9/1993  Stymiest ............................... 215/228

*Primary Examiner*—Henry J. Recla
*Assistant Examiner*—Steven O. Douglas
*Attorney, Agent, or Firm*—Daniel C. McKown

[57] ABSTRACT

The lid is adapted for use with a container the mouth of which has a particular size and shape. After the lid has been placed on the mouth of the container, the air or other gas within the container is evacuated by manual operation of a pump actuator. The actuator is repeatedly pushed toward the bottom of the container. The pump includes a bellows and two check valves, and the pump is removably installed in the lid by inserting a resilient plug on the pump into a first hole in the lid. The vacuum may be released by pushing once on an actuator that operates a vacuum release valve. The vacuum release valve is removably installed in the lid by inserting a resilient plug of the valve into a second hole in the lid. When the container is evacuated, the pump actuator and the vacuum release valve actuator are flush with the upper face of the lid to facilitate stacking of the containers. Because the pump and the vacuum release valve are easily removed from the body of the lid, cleaning of the parts of the lid and subsequent reuse of the lid are promoted.

7 Claims, 3 Drawing Sheets

EASILY-CLEANED REUSABLE LID INCLUDING AN EVACUATING PUMP

REFERENCE TO RELATED APPLICATION

The present application is a continuation-in-part of U.S. Pat. application Ser. No. 08/049,005 filed Apr. 19, 1993 for "Self-contained Evacuation Lid", to be issued Apr. 18, 1995 as U.S. Pat. No. 5,406,992.

BACKGROUND OF THE INVENTION

1. Field of the Invention

The present invention is in the field of containers and more particularly relates to a lid for a container, the lid having a shape that facilitates stacking of the containers, having a structure that permits it to be cleaned for reuse, and having an integral pump for use in evacuating air from the container. The design of the lid facilitates its use by handicapped persons.

2. The Prior Art

The nearest known prior art is U.S. Pat. No. 2,890,810 issued Jun. 16, 1959 to Rohling. This patent discloses a vacuum pump that is an integral part of a lid that is removable from a container. The vacuum pump includes a chamber closed on one side by a deformable membrane. A force applied manually against the deformable membrane reduces the volume of the chamber, thereby forcing air out of it through a flap-type valve. When the manually-applied force is released, the chamber expands to its original size, with the assistance of a compressed spring in one embodiment or by the elasticity of the membrane in another embodiment, while air is drawn into the chamber from the container through a second flap-type valve. The patent describes the cementing together of its parts. Although a protective disc is provided to shield the air intake from the contents of the container, it is clear that some of the contents could lodge under the disc or could splash into the air intake and be drawn into the pump, where they might decay or impart an undesirable taste to food that is later stored in the container.

To the present inventor it seems axiomatic that if the lid is to be reusable then it must be easily cleaned to avoid contamination of later-stored contents.

In U.S. Pat. No. 3,672,114, issued Jun. 27, 1972, Sacks describes a device for evacuating containers. In his device a bellows is cemented to a lid. A flap-type check valve is provided at each end of the bellows, which is manually operated to evacuate the container. The presence of the bellows makes it unlikely that the containers can be stacked.

In U.S. Pat. No. 4,016,999, issued Apr. 12, 1977, Denzer describes a piston-type pump that is part of the lid. Denzer also provides a vent for relieving the vacuum.

In U.S. Pat. No. 4,249,583 issued Feb. 10, 1981, Lundbladh describes a device for evacuating a container. Although his device bears a superficial similarity to that of Denzer, the crucial difference is that in Lundbladh the piston-type pump is separable from the lid which makes it practical to stack the evacuated containers.

In U.S. Pat. No. 4,278,114 issued Jul. 14, 1981, Ruberg describes a pump that, like Lundbladh's, is separable from the lid of the container to facilitate stacking of the containers. However, Ruberg's pump, unlike that of Lundbladh, is arranged so that the suction stroke occurs as the piston is pushed toward the lid so that the force applied to the piston is transmitted to the seal between the pump and the lid thereby producing a stronger sealing action.

As will be seen below, the pump of the present invention is intended to remain a part of the lid and in this regard the present invention more nearly resembles that of Rohling. However, unlike the lid of Rohling, the lid of the present invention is structured in such a way that it can readily be disassembled for cleaning.

SUMMARY OF THE INVENTION

The present invention is a lid of a type that is reusable and that includes a built-in evacuation pump.

The present invention differs from other lids of this type in two main ways.

First, the lid of the present invention is easily taken apart for cleaning and is easily reassembled for reuse. This is made possible by the use of snap-in components.

Second, the lid of the present invention is easier for physically handicapped persons to use. This is achieved by locating the actuating levers for the pump and for the vent at the periphery of the lid where it is easy to apply an actuating force to them.

In addition to these advantages, the lid of the present invention does not interfere with stacking of the containers to which the lids are affixed.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
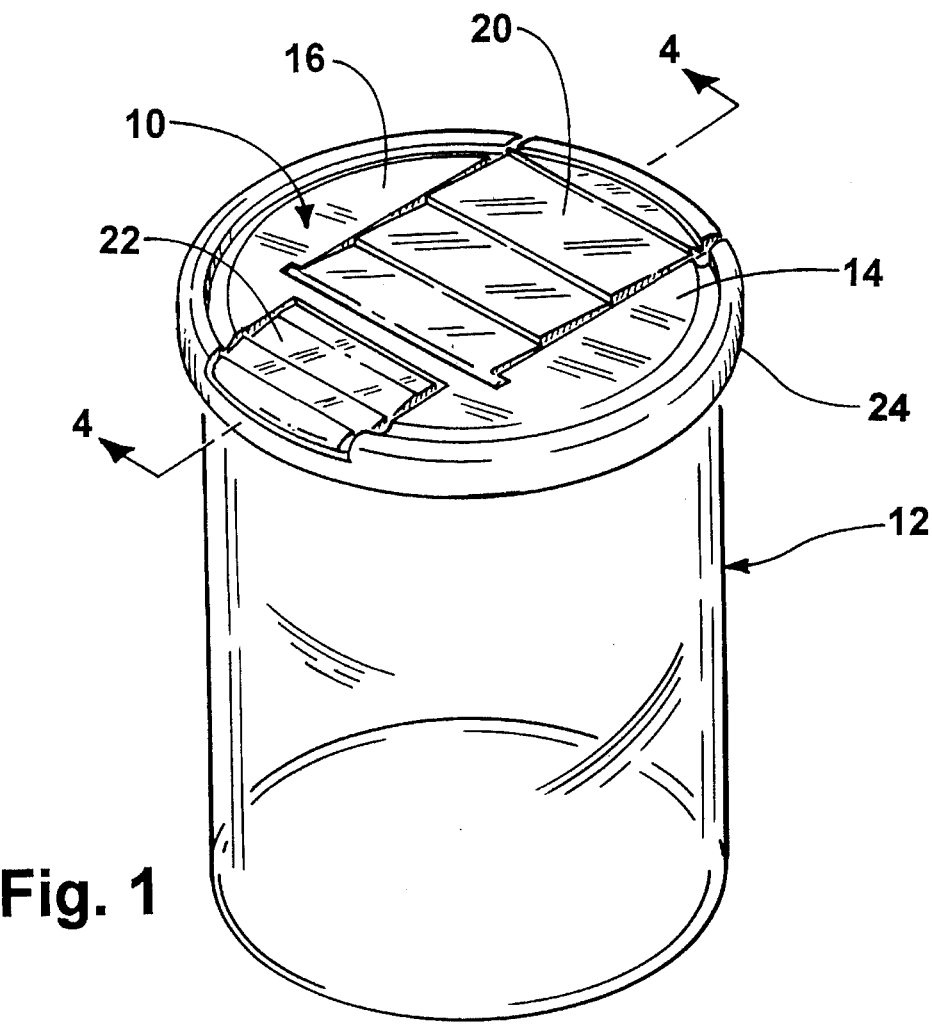
FIG. 1 is a perspective view showing the lid in a preferred embodiment in use on a container.

FIG. 1 is a perspective view showing the easily-cleaned reusable lid 10 installed on a container 12. In the preferred embodiment, the body 14 of the lid includes an upper face 16 and a lower face 18 (visible in FIG. 4). Also shown in FIG. 1 are the pump actuator 20 and the vacuum release valve actuator 22.

The pump actuator 20 is repeatedly pushed downward toward the bottom of the container to evacuate air from the container. The vacuum thus created makes it difficult to remove the lid 10 so long as the vacuum persists. Thus, when it is desired to open the container, the vacuum release vane actuator 22 is pushed downward once to admit air to the container, thereby making it much easier to remove the lid 10. As seen in FIG. 1, both the pump actuator 20 and the vacuum release valve actuator 22 extend within recesses in the upper face 16 to the periphery 24 of the lid.

Figure 2:
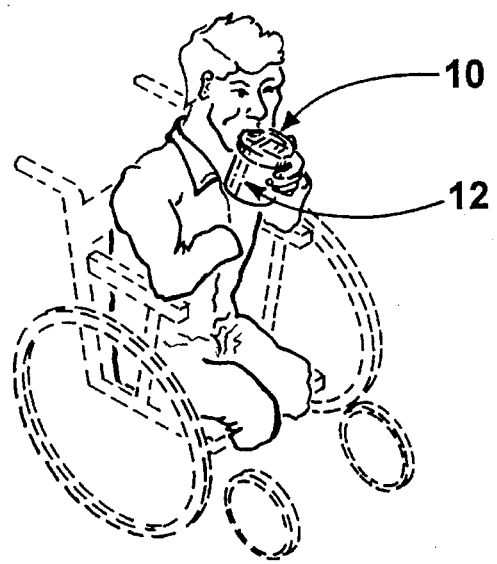
FIG. 2 is a perspective view showing a handicapped person using the lid of the present invention.

Because the actuators 20 and 22 extend to the periphery 24 of the lid, it is possible for a handicapped person to operate the actuators as indicated in FIG. 2.

Figure 3:
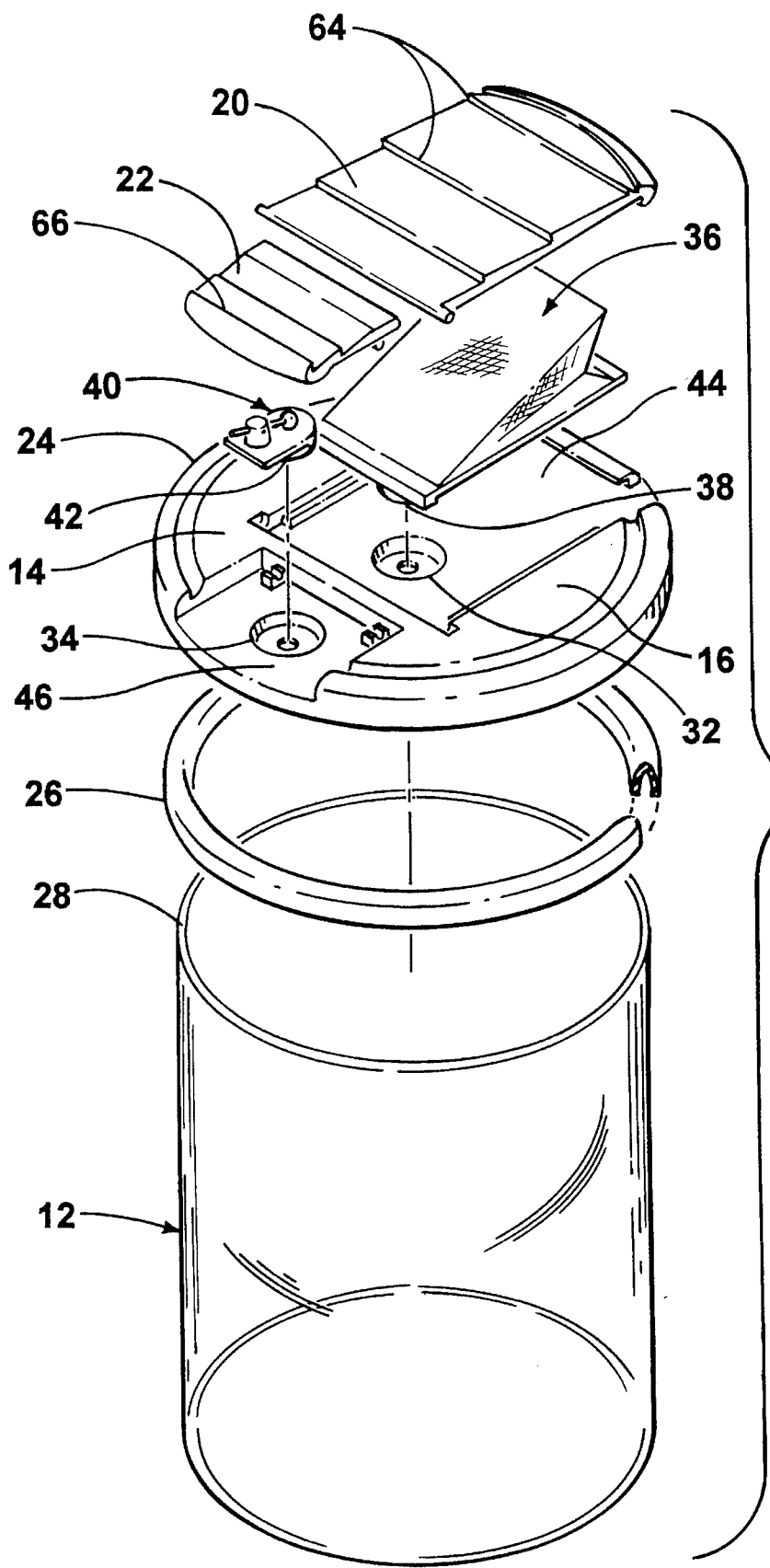
FIG. 3 is an exploded perspective view showing how the components of the lid are assembled in a preferred embodiment.

FIG. 3 is an exploded perspective view of the lid in a preferred embodiment. Although the container 12 shown in FIG. 3 has a circular mouth, it will be recognized that the invention described herein can easily be adapted for use on the containers having mouths of other shapes, such as rectangular.

Figure 4:
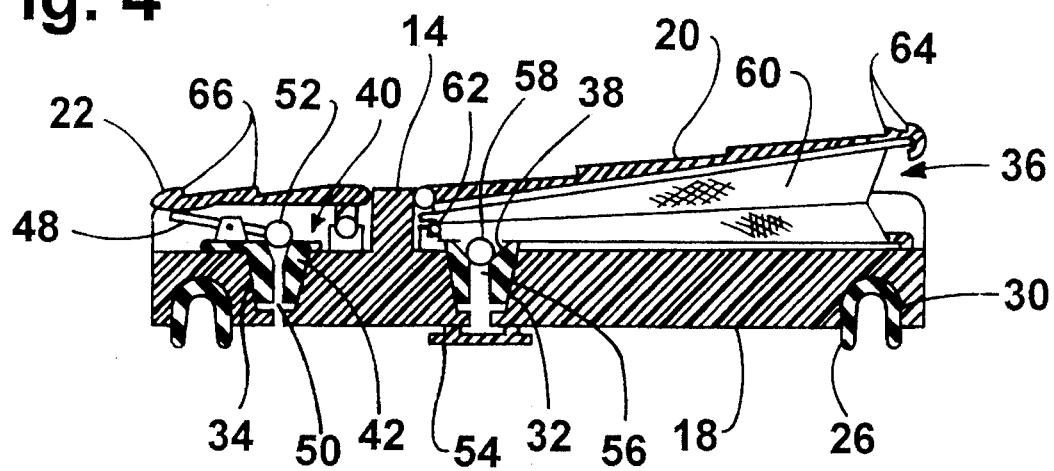
FIG. 4 is a medial cross sectional side elevational view in a preferred embodiment, in the direction 4—4 indicated in FIG. 1.

Because, in the preferred embodiment the body 14 of the lid 10 is composed of plastic, a soft resilient seal 26 is provided to reduce the likelihood of leakage between the lower face of the body 14 and the rim 28 of the container. In the preferred embodiment shown in FIG. 3, the sealing gasket 26 has an inverted U-shaped cross section that is sized to fit down over the rim 28 of the container. As best seen in FIG. 4, the lower face 18 of the body 14 includes a groove 30. The sealing gasket 26 extends partially into the groove 30 and is in sealing engagement with the groove 30 when the container is evacuated.

The body 14 of the lid includes a first hole 32 and a second hole 34, both of which extend completely through the body. In the preferred embodiment, the evacuating pump 36 includes a resilient plug 38 that is removably inserted into the first hole 32 in sealing engagement with the body 14. Likewise, the vacuum release valve 40 also includes a resilient plug 42 that is removably inserted into the second hole 34 in sealing engagement with the body 14.

To accommodate the evacuating pump 36 and its actuator 20, the body 14 includes a first portion 44 recessed into the upper face 16. Likewise, to accommodate the vacuum release valve 40 and the vacuum release valve actuator 22, the body 14 includes a second portion 46 recessed into the upper face 16. Like the actuators 20 and 22, the first and second recessed portions 44 and 46 extend to the periphery 24 of the body 14.

As seen in FIG. 3, after the evacuating pump 36 and the vacuum release valve 40 have been emplaced in the recessed portions 44 and 46, the pump actuator 20 and the vacuum release valve actuator 22 are snapped into place.

As best seen at the left side of FIG. 4, the vacuum release valve 40 includes a resilient plug 42 that fits snugly in the second hole 34 in sealing engagement with the body 14. The resilient plug 42 includes a passage 50 that is releasably blocked by the ball 52. The ball 52 is attached to a lever 48 so that downward motion of the vacuum release valve actuator 22 unseats the ball 52, thereby permitting air to rush in below the vacuum release valve actuator 22, through the passage 50 and into the container 12, thereby relieving the vacuum.

In the preferred embodiment of FIG. 4, the evacuating pump 36 includes a resilient plug 38 that fits snugly into the first hole 32 in sealing engagement with the body 14. The resilient plug 38 includes a passage 56 that is releasably closed by a ball 58. A splash guard 54 is provided to keep material stored in the container from getting into the passage 56.

The evacuating pump 36 includes a bellows 60 that is biased to the expanded position shown in FIG. 4 by the resilience of the bellows or by a spring. When the pump actuator 20 is pushed downward, air is expelled from the bellows 60, through the check valve 62. When the pump actuator 20 is released, the bellows 60 returns to the position shown in FIG. 4, and as it returns, air is drawn from the container through the passage 56 and into the bellows. On the next downward stroke of the pump actuator 20, the ball 58 seals the passage 56, and so the air in the bellows is again vented through the valve 62. With further operation of the pump actuator 20, less air remains in the container, and the air in the bellows 60 is at a reduced pressure. As a result, the pump actuator 20 does not rise up so high, and as the ultimate obtainable vacuum is approached, the actuator 20, when released, assumes an attitude that is flush with the upper face 16, as shown in FIG. 1. In this way the lid of the evacuated container facilitates stacking because neither the pump actuator nor the vacuum release valve actuator protrudes above the upper face 16 of the lid.

A number of transverse grooves 64 are provided at the outer end of the pump actuator 20 so that it can be more easily engaged by a handicapped person. A similar set of grooves 66 is provided at the outer end of the vacuum release valve actuator 22.

Figure 5:
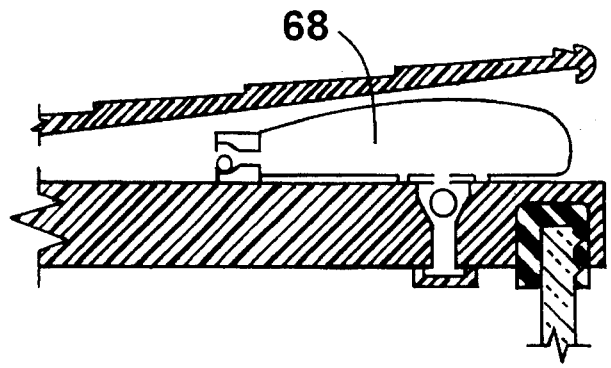
FIG. 5 is a fractional medial cross sectional side elevational view in a first alternative embodiment; and, FIG. 6 is a fractional medial cross sectional side elevational view in a second alternative embodiment.

FIG. 5 shows an alternative embodiment which differs from the preferred embodiment of FIG. 4 in that the evacuating pump includes a single bladder 68 instead of the bellows 60 used in the preferred embodiment.

Figure 6:
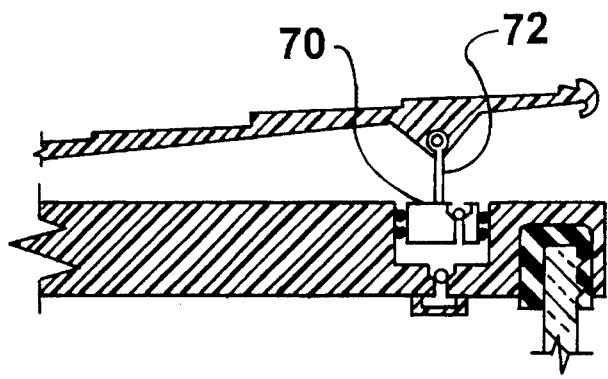

FIG. 6 shows a third embodiment of the invention in which the evacuating pump includes a small piston 70 that is connected to the pump actuator 20 by means of a connecting rod 72.

Thus, there has been described an easily-cleaned reusable lid that includes an evacuating pump, so that when the lid is placed on a container, air may be evacuated from the container, leaving the stored contents at a reduced air pressure.

It has been shown that when the container is evacuated, the pump actuator and the vacuum release valve actuator are flush with the upper face of the lid, so as not to interfere with stacking of the containers.

From the above description it is seen that the major components of the lid, namely the pump and its actuator and the vacuum release valve and its actuator, are easily removed from the body of the lid. This greatly facilitates cleaning the components and the spaces between them and the body of the lid. Germs, bits of decaying food, and undesirable odors can therefore be eliminated, and this promotes reuse of the lid.

Use of the lid has been made easier for handicapped persons by extending the pump actuator and the vacuum release valve actuator to the periphery of the lid and by providing a series of transverse grooves at the peripheral end of each of the actuators so that handicapped persons can manipulate the actuators more readily.

Although several embodiments of the lid have been described above, a number of additional variations will be apparent to workers skilled in the art. These additional variations are considered to be within the spirit and scope of the present invention as defined by the following claims.

What is claimed is:

1. An easily-cleaned reusable lid including an evacuating pump for use on a container, comprising:
   a body including an upper face and a lower face, and including a first hole and a second hole both extending completely through said body from said upper face to said lower face;

an evacuating pump including a resilient plug removably inserted into said first hole in sealing engagement with said body;

a pump actuator;

first means for removably and pivotally attaching said pump actuator to said body;

a vacuum release valve including a resilient plug removably inserted into said second hole in sealing engagement with said body;

a vacuum release valve actuator; and, second means for removably and pivotally attaching said vacuum release valve actuator to said body.

2. The easily-cleaned reusable lid of claim 1 wherein said body further includes a groove extending into the lower face, and further including a sealing gasket extending into said groove and sealingly engaging said groove and the container.

3. The easily-cleaned reusable lid of claim 1 wherein said pump actuator extends to the periphery of said body.

4. The easily-cleaned reusable lid of claim 1 wherein said vacuum release valve actuator extends to the periphery of said body.

5. The easily-cleaned reusable lid of claim 1 wherein said body further includes a first portion recessed into said upper face and surrounding said first hole for receiving said evacuating pump and said pump actuator.

6. The easily-cleaned reusable lid of claim 1 wherein said body further includes a second portion recessed into said upper face and surrounding said second hole for receiving said vacuum release valve and said vacuum release valve actuator.

7. The easily-cleaned reusable lid of claim 1 wherein said evacuating pump includes a bellows.

* * * * *